(12) United States Patent
Anantharam et al.

(10) Patent No.: US 9,503,397 B2
(45) Date of Patent: Nov. 22, 2016

(54) APPLYING A CLIENT POLICY TO A GROUP OF CHANNELS

(71) Applicant: INTERNATIONAL BUSINESS MACHINES CORPORATION, Armonk, NY (US)

(72) Inventors: Sushma Anantharam, Cupertino, CA (US); Dayavanti G. Kamath, Santa Clara, CA (US); Keshav G. Kamble, Fremont, CA (US); Vijoy A. Pandey, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 13/741,982

(22) Filed: Jan. 15, 2013

(65) Prior Publication Data
US 2014/0201346 A1 Jul. 17, 2014

(51) Int. Cl.
| | |
|---|---|
| *G06F 15/173* | (2006.01) |
| *H04L 12/931* | (2013.01) |
| *H04L 12/24* | (2006.01) |
| *H04L 12/813* | (2013.01) |

(52) U.S. Cl.
CPC ........... *H04L 49/70* (2013.01); *H04L 41/0893* (2013.01); *H04L 47/20* (2013.01)

(58) Field of Classification Search
CPC .... H04L 41/0893; H04L 47/20; H04L 49/70
USPC .......................................................... 709/223
See application file for complete search history.

(56) References Cited

U.S. PATENT DOCUMENTS

| | | | |
|---|---|---|---|
| 6,877,041 B2 | 4/2005 | Sullivan | |
| 7,962,647 B2 | 6/2011 | Suri et al. | |
| 8,131,852 B1 | 3/2012 | Miller et al. | |
| 8,639,783 B1* | 1/2014 | Bakke et al. ................. | 709/220 |
| 2002/0049841 A1* | 4/2002 | Johnson et al. ............... | 709/225 |
| 2005/0276263 A1* | 12/2005 | Suetsugu et al. ............. | 370/389 |
| 2008/0301759 A1 | 12/2008 | Rivers et al. | |
| 2009/0083445 A1 | 3/2009 | Ganga | |
| 2010/0054260 A1 | 3/2010 | Pandey et al. | |
| 2010/0214949 A1 | 8/2010 | Smith et al. | |
| 2011/0035494 A1 | 2/2011 | Pandey et al. | |
| 2011/0243142 A1 | 10/2011 | Kwon et al. | |
| 2011/0255538 A1 | 10/2011 | Srinivasan et al. | |
| 2011/0299533 A1 | 12/2011 | Yu et al. | |
| 2011/0299534 A1 | 12/2011 | Koganti et al. | |

(Continued)

OTHER PUBLICATIONS

Stone, G.N. et al., "Network policy languages: a survey and a new approach," IEEE Network, vol. 15, Iss. 1, pp. 10-21, Jan./Feb. 2001.

(Continued)

*Primary Examiner* — Wing F Chan
*Assistant Examiner* — Joseph Maniwang
(74) *Attorney, Agent, or Firm* — Shimokaji IP

(57) ABSTRACT

Management and provisioning of networking traffic may be provided by bundling virtual channels into a group. A global policy may be applied to the bundle so that virtual ports providing services to a client may be managed by referring to the global policy of the bundle. The channels comprising the bundle may span multiple physical ports and in some cases, multiple physical switches. Thus, policy management may be avoided at the port level and instead, be handled as groups of channels implementing a client service.

15 Claims, 6 Drawing Sheets

(56) References Cited

U.S. PATENT DOCUMENTS

2012/0076149 A1* 3/2012 Ko et al. .................. 370/395.53
2012/0093035 A1* 4/2012 Kidambi et al. .............. 370/255
2012/0233492 A1* 9/2012 Finn et al. ..................... 714/4.1
2012/0287930 A1* 11/2012 Raman .......................... 370/392
2013/0308647 A1 11/2013 Rosset et al.
2014/0012966 A1 1/2014 Baphna et al.
2014/0201732 A1* 7/2014 Haag et al. ........................ 718/1

OTHER PUBLICATIONS

Office Action in U.S. Appl. No. 14/070,991 dated Nov. 20, 2014.

* cited by examiner

APPLYING A CLIENT POLICY TO A GROUP OF CHANNELS

BACKGROUND

The present invention relates to network management, and more specifically, to a applying a client policy to a group of channels.

Network traffic going through a physical port may be controlled or monitored via properties that are applied to the physical port itself. Furthermore, an 802.1Qbg standard may define how virtual ports may be created and how to apply policies on each of the individual virtual ports. Under the IEEE 802.1Qbg standard, one or more "S-Channels" may be created and each channel may be associated with a profile ID. A server can have multiple virtual machines (VMs), where a network administrator can set up the policy (or a profile ID) for a given VM in a network database. When the VM is registered with a switch, the switch can query the network database to get one or more fields of the specified profile ID and map at least one field to the VM.

A problem may arise when certain services for a given client or a customer are to be offered based on (or using) an aggregate group of these S-Channels or virtual ports that can span different physical ports. For example, a given customer may require (or may be required to have) certain policies regarding services or restrictions (e.g. per customer's service level agreement (SLA)) to be applied to all of the customer's channels. These types of policies may not be put in the profile ID because the profile ID may be applicable to multiple customers and the channel may need customer specific configuration(s). Thus, a challenge is presented in how to standardize maintaining operating properties for each channel or virtual port profile and/or access control lists (ACLs) while complying with the properties for the aggregate bundle or group of channels.

SUMMARY

According to one embodiment of the present invention, a computer program product for managing network traffic, comprises a computer readable storage medium having computer readable program code embodied therewith. The computer readable program code is configured to establish a plurality of virtual ports of a virtual machine in a physical server. A plurality of virtual channels may be established assigned to the plurality of virtual ports. A number of the virtual channels may be grouped together into a bundle. A global policy may be applied to the bundle. The policy may relate to a client service.

According to another embodiment of the present invention, a network system comprises a server, one or more physical switches on the server, a virtual machine, and an operating system. The virtual machine may include one or more virtual ports on physical switches. The operating system may be configured to establish one or more virtual channels associated with the one or more virtual ports, group a number of the virtual channels together into a bundle, and apply a set of properties to the bundle. The set of properties may define a policy applicable to each virtual channel associated with the bundle.

According to yet another embodiment of the present invention, a network switch comprises a plurality of physical ports, a virtual machine, and an operating system. The virtual machine may include one or more virtual ports connected through the plurality of physical ports via a plurality of virtual channels. The operating system may be configured to group a number of the virtual channels together into a bundle, apply a profile to each virtual port defining allowed policies for implementation of a client service, and apply a global policy to the bundle. The global policy may define which virtual ports in the network switch include the profile.

DETAILED DESCRIPTION

Figure 1:
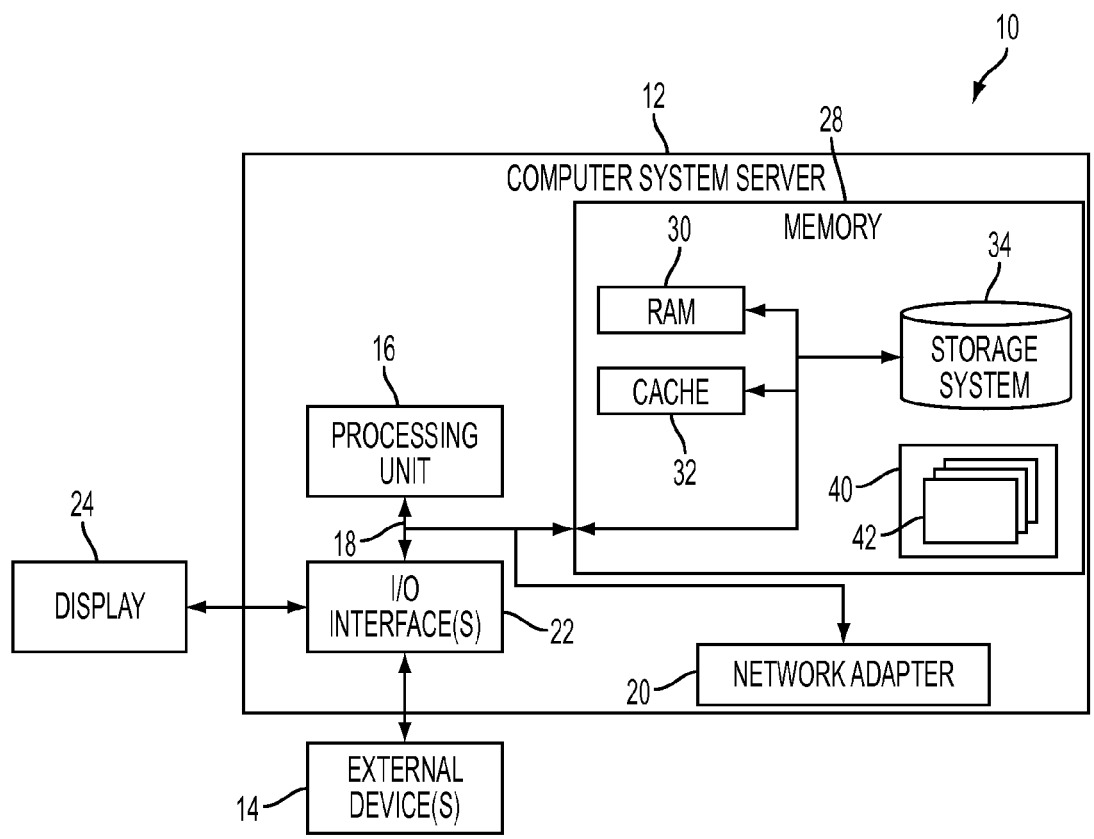
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may include:

On-demand self-service: a cloud consumer can unilaterally provision computing capabilities, such as server time and network storage, as needed, automatically, without requiring human interaction with the service's provider.

Broad network access: capabilities are available over a network and accessed through standard mechanisms that promote use by heterogeneous thin or thick client platforms (e.g., mobile phones, laptops, and PDAs).

Cloud Software as a Service (SaaS): the capability provided to the consumer may be to use the provider's applications running on cloud infrastructure. The applications may be accessible from various client devices through a thin client interface such as a web browser (e.g., web-based email). The consumer need not necessarily manage or control the underlying cloud infrastructure including network, servers, operating systems, storage, or even individual application capabilities, with the possible exception of limited user-specific application configuration settings.

Resource pooling: the provider's computing resources may be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities may be rapidly and elastically provisioned, in some cases automatically to quickly scale out, and may be rapidly released to quickly scale in. To the consumer, the capabilities available for provisioning often appear to be unlimited and can be purchased in any quantity at any time.

As will be appreciated by one skilled in the art, aspects of the present invention may be embodied as a system, method or process, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a schematic of an example of a cloud computing node 10 is shown. The cloud computing node 10 illustrated is only one example of a suitable cloud computing node and is not intended to suggest any limitation as to the scope of use or functionality of embodiments of the invention described herein. Regardless, the cloud computing node 10 is capable of being implemented and/or performing any of the functionality set forth hereinabove.

In the cloud computing node 10 there is a computer system/server 12, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, a computer system/server 12 in the cloud computing node 10 is shown in the form of a general-purpose computing device. The components of the computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 may typically include a variety of computer system readable media. Such media could be chosen from any available media that is accessible by computer system/server 12, including volatile and non-volatile media, removable and non-removable media.

The system memory 28 could include one or more computer system readable media in the form of volatile memory, such as a random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media device typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. Alternatively, the computer system/server 12 can communicate with one or more networks such as a local area network (LAN), a general wide area network (WAN), and/or a public network (e.g., the Internet) via a network adapter 20. As depicted, the network adapter 20 may communicate with the other components of computer system/server 12 via the bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Figure 2:
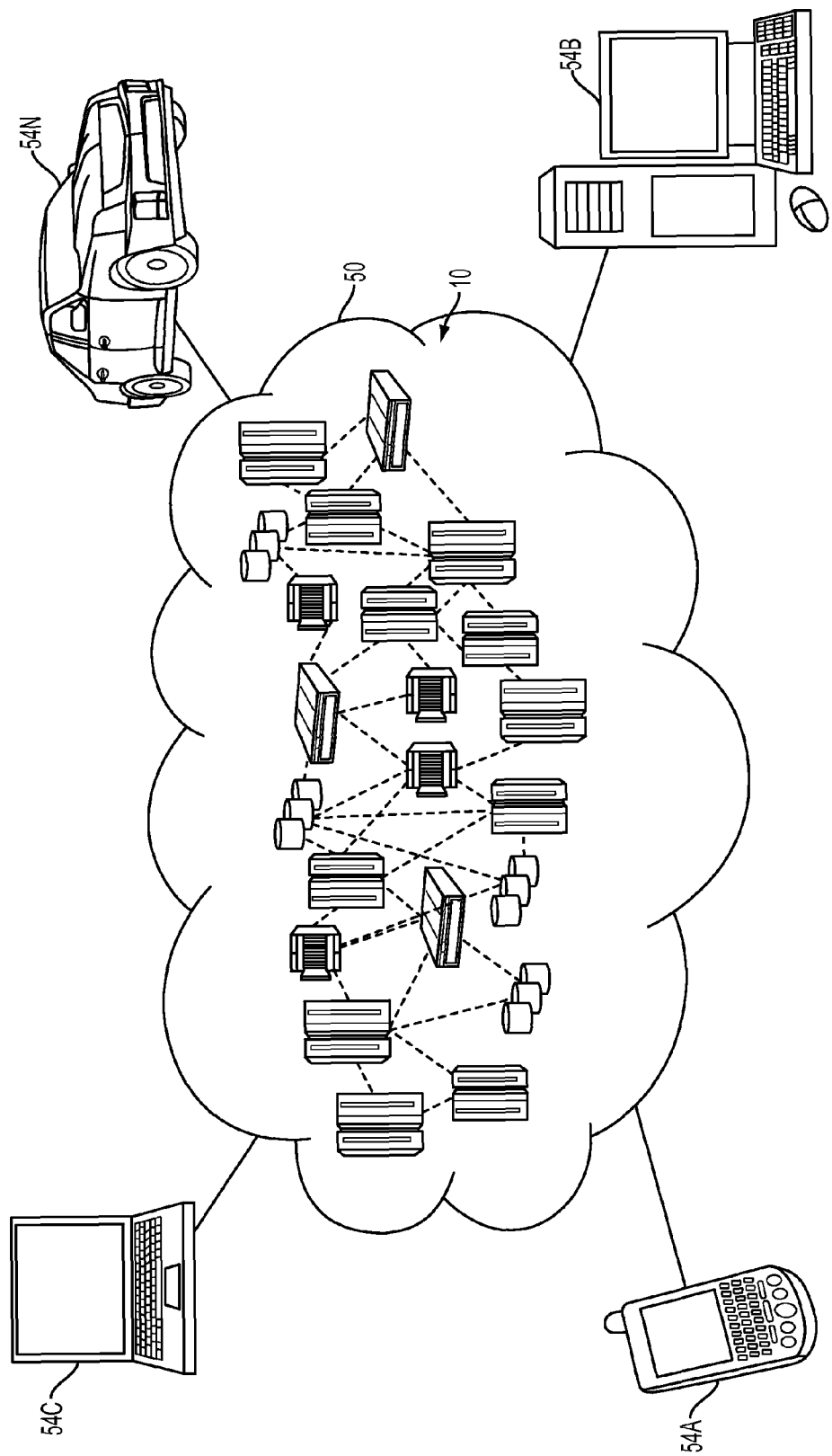
FIG. 2 depicts a cloud computing environment according to another embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, a personal digital assistant (PDA) or a cellular telephone 54A, desktop computer 54B, laptop computer 54C, and/or a automobile computer system 54N, may communicate. The nodes 10 may communicate with one another. They may be grouped physically or virtually, in one or more networks, such as Private, Community, Public, or Hybrid clouds as described hereinabove, or a combination thereof. This allows cloud the computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that the computing nodes 10 and the cloud computing environment 50 can communicate with any type of computerized device over any type of network and/or network addressable connection (e.g., using a web browser).

Figure 3:
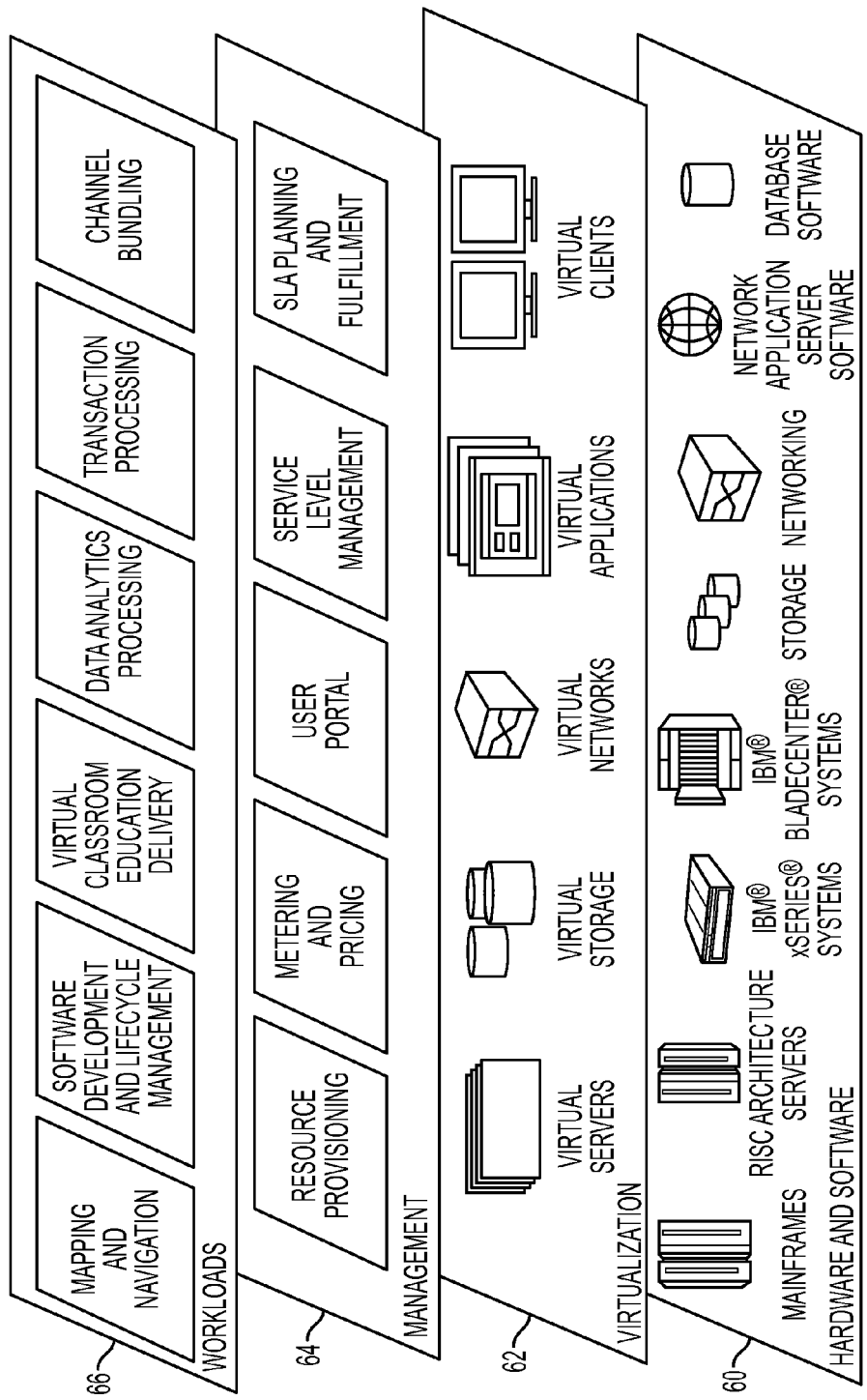
FIG. 3 depicts abstraction model layers according to yet another embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 may include hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A workloads layer 66 may provide functionality for which the cloud computing environment may be utilized. Examples of workloads and functions which may be provided from this layer include: mapping and navigation; software development and lifecycle management; virtual classroom education delivery; data analytics processing; transaction processing; and network channel bundling.

In general, embodiments of the present invention may provide a method of applying a given policy to a group of channels. One more services may be offered on a bundle or a group of virtual ports, where any one of the virtual ports can be associated with any one of an existing group of physical ports. A server and switch combination may be aggregators across different physical ports, and/or different physical servers, where any one of the offered services may comprise one or more fields, wherein at least one of the fields may be replicated and applied across all the specified channels within the defined group of channels or virtual ports.

Figure 4:
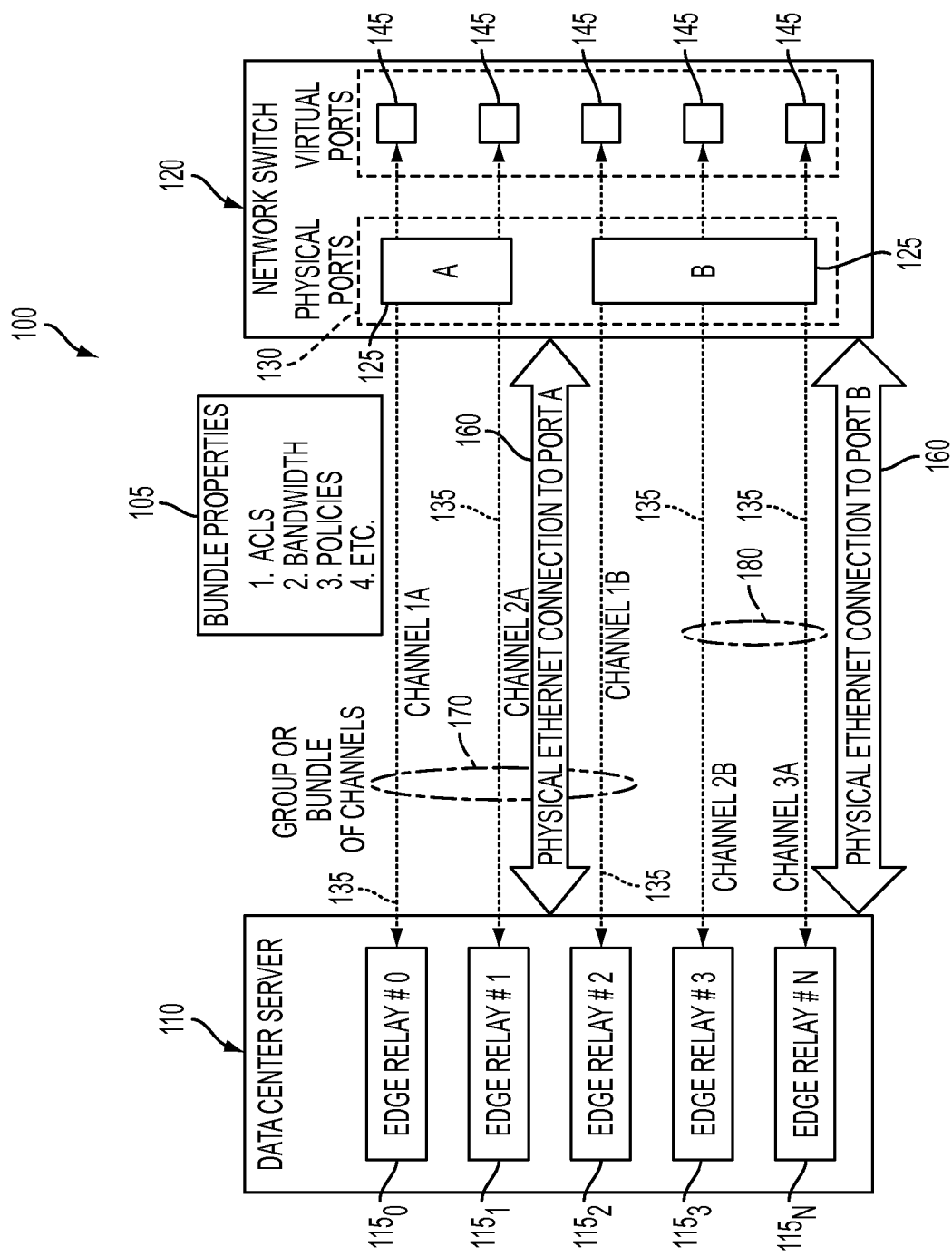
FIG. 4 is a block diagram of a network system according to still another embodiment of the present invention.

Referring now to FIG. 4, a network system 100 (referred to sometimes as system 100) is shown according to an exemplary embodiment of the present invention. The system 100 may include a data center server 110 in communication with a network switch 120 in a multi-channel environment via a plurality of channels 135. The data center server 110 may include a plurality of data sources, for example edge relays $115_0$, $115_1$, $115_2$, $115_3$ to $115_n$, (referred to collectively as relays 115). Two physical ports 125 (labeled as "A" and "B") may connect the data center server 110 to the network switch 120. Physical connections between the data center server 110 and the network switch 120 may be provided by Ethernet connections 160. For sake of illustration only, the channels 135: "1A", "2A", and "3A" are defined as part of physical port 125 "A", and channels 135: "1B" and "2B" are defined as part of physical port 125 "B". In this example, both ports 125: "A" and "B" are physically located within the same network switch 120. Software may configure the network switch 120 to include a plurality of virtual ports 145 residing within the network switch 120.

The channels 135 may be virtual channels established or created to provide a connection between a VM running on the data center server 110 and one or more of the virtual ports 145 on the network switch 120. Each channel 135 may be created within either port 125 ("A" or "B"). For example, FIG. 4 shows Channel 1A, and Channel 2A within port 125A, and Channel 1B, Channel 2B and Channel 3A within port 125B. A group of channels 135 or virtual ports 145 may be defined per client as a bundle 170, 180. In some embodiments, the channels 135 may be S-channel types. Client specified properties may be applied or shared between all of the channels 135 of the bundle 170, 180.

A bundle 170, 180 may span multiple physical ports 125. For example, a bundle 170, 180 may be defined to receive a first client (or service type or customer) set of properties. Each property may include one or more field values. An exemplary set of properties may be seen in table 105. Bundle 170 may comprise three specified channels 135, for example, those labeled as "1A", "2A", and "1B" that span both physical ports 125 "A" and "B". Similarly, channels 135 labeled as "3A" and "2B" may be grouped together as bundle 180 and may be defined to receive a second client (or service type or customer) set of properties. Bundle 180 may also span both physical ports 125: "A" and "B".

In some embodiments, all the traffic going via a single channel 135 may be tagged according to the channel designation, for example, "channel 1A". The receiving entity may determine, using the channel's tag, that it is Ch. 1A, and may apply the policies pre-specified for channel 1A traffic. There may various types of properties (for example those in table 105) which may be defined as part of the channel's profile.

In an exemplary embodiment, a group of virtual channels 135 (for example, bundles 170, 180) may be established where a given client or group policy may possess or share different service types or profiles. The group of virtual channels 135 may comprise one or more virtual channels that may have common or similar characteristics but do not necessarily have the same profile or correspond to the same server or switch as the other channels.

Figure 5:
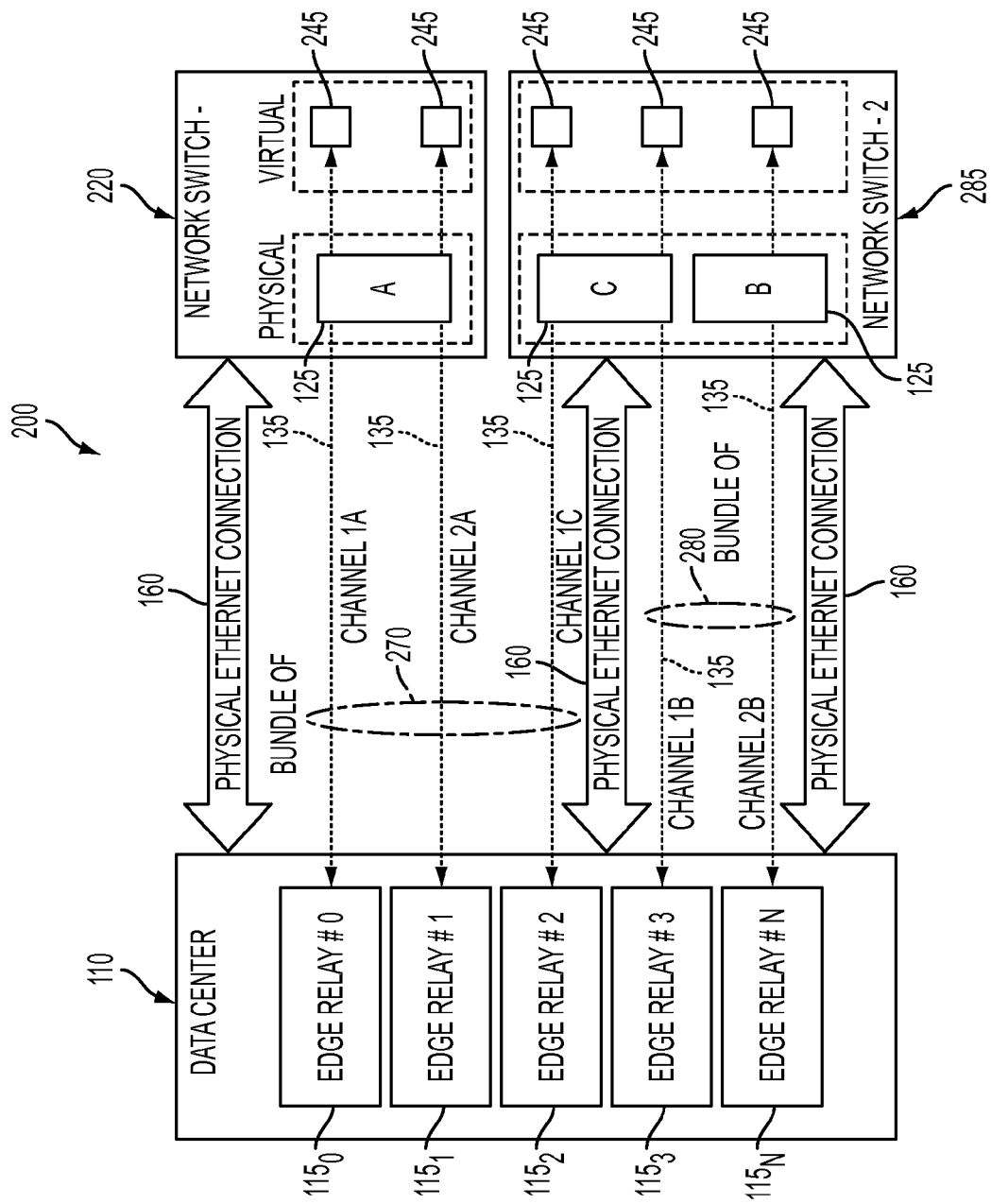
FIG. 5 is a block diagram of a network system according to yet another embodiment of the present invention.

For example, as shown in FIG. 5, a system 200 is shown, similar to system 100 except that the data center server 110 may be connected to multiple network switches 220 and 285. The network switch 220 may include the physical port 125 "A". The network switch 285 may include the physical port 125 "B" and a third physical port 125 "C". Furthermore, channels "1A" and "2A" may be defined as part of physical port 125 "A". Channels 135 "1B" and "2B" may be defined as part of physical port 125 "B". Channel 135 "1C" may be defined as part of physical port 125 "C".

A bundle 270 of channels 135 may be defined to receive another client (or service type or customer) set of properties. Bundle 270 may comprise three channels 135: "1A", "2A", and "1C" that may span both physical ports 125: "A" and "C". Channels 135: "1B" and "2B" may be grouped into a bundle 280, which may defined to receive a fourth client (or service type or customer) set of properties. In exemplary embodiments of the present invention, channels 135 may be grouped together into a global group, where all the channels 135 may be defined across and spanning multiple switches (for example, switches 220 and 280) or servers.

In an exemplary embodiment, the specified channels within the bundle 270 may comprise virtual channels 135 of different types of network traffic. Each virtual channel 135 may be defined by a profile. Each profile may include an individual profile identification (ID) and policy parameters defining a policy usable on the channel. Profile IDs may be mapped to each channel 135 which may be provided to the switch 220 or 280 corresponding to the channel 135. The switch 220 or 280 may look up the profile ID in a table and may set the policies applicable to the channel 135 based on the information in the table. For example, channel 135 "1A" and channel 135 "2A" may be defined to have a storage traffic profile. Storage traffic services may need guaranteed end to end reliability and thus a lossless traffic policy may be applied to the traffic of channels "1A" and "2A". Channel 135 "1C" may be defined to possess a web server profile, and thus a specific web traffic policy may be applied to channel "1C". For example, a client may want to prioritize bandwidth usage across channels 135 using a bandwidth policy.

The bandwidth policy may include SLA's applied to queues of the virtual ports 245 to obtain the necessary bandwidth.

By applying an overall client policy to a bundle 270, 280, the grouping of multiple channels 135 may be realized when all three channels 135, for example channels "1A", "2A", and "1C" belong to the same client or customer. When employing a client's SLA, client policies specific to that client may be applied to all of the client's channels. In some embodiments, the properties of such a customer's policy may not necessarily be implemented or used in the profile ID of each individual virtual channel because the profile ID may span to different customers and also may have various generic shared properties with other channels located associated with the same physical port 125. Thus, in an exemplary embodiment, a client's policy may be generated using the client's SLA and then the client's policy may be applied to or matched to a bundle 280 that spans any of the channels 135 used by a client. This may be beneficial for example in a dynamic environment when a server transfers a virtual machine to another server.

Figure 6:
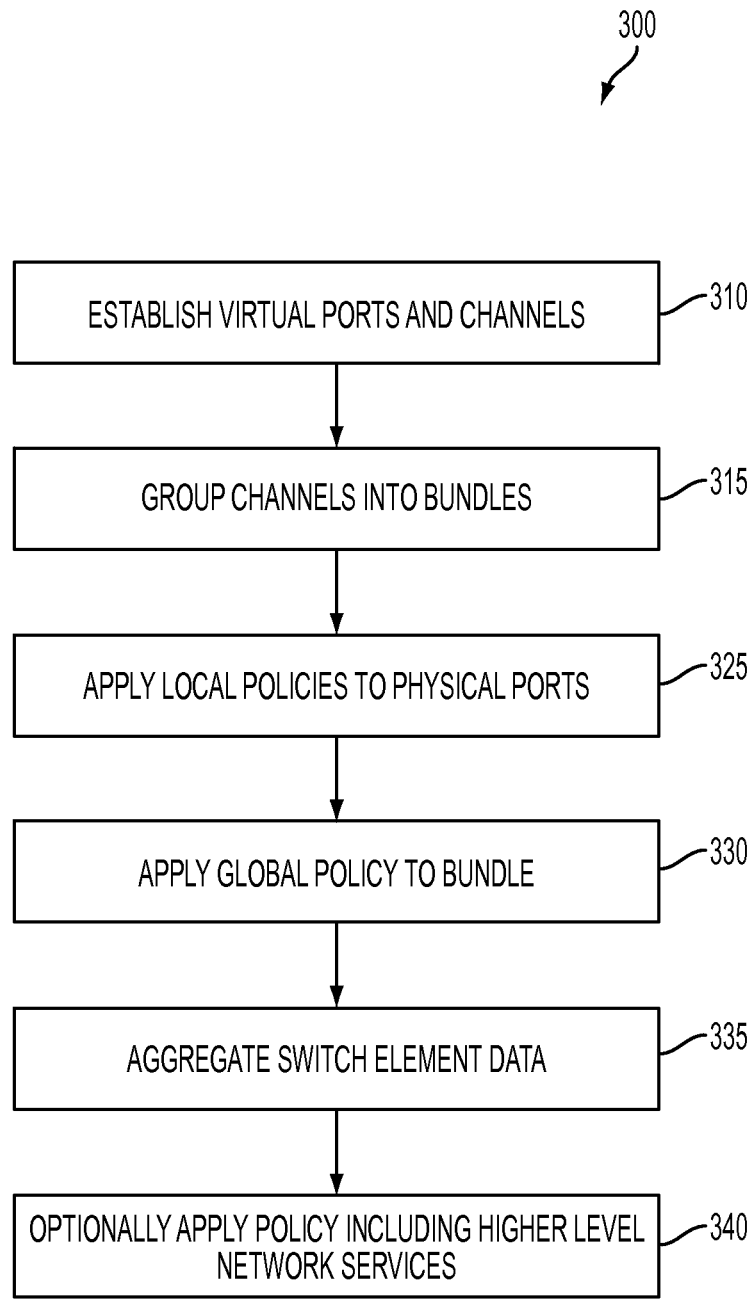
FIG. 6 is a flowchart of a method of according to yet another embodiment of the present invention.

Referring now to FIG. 6, a method 300 of applying a customer's policy to a group of channels 135 is shown according to an exemplary embodiment of the present invention. An operating system may establish (310) a plurality of virtual ports and channels to the ports on a switch(es). The operating system may group (315) a plurality of channels into bundles. The operating system may use hardware assisted support to apply (325) a local policy to all physical ports on a switch that correspond to channels within the bundle. The hardware assist function may keep track of all ports within a physical hardware platform. For example, if bandwidth metering is desired for all traffic for a given customer, in accordance with the customer's SLA, then a hardware assisted "metering bucket" may be dynamically realized that may track a customer's traffic across multiple physical ports within the same switch or server. However, if the bundle spans multiple switches or servers, then the hardware assist function may require additional coordination and synchronization between the various hardware platforms to maintain or apply (330) a global policy to the bundle. The operating system may use software to aggregate (335) data from various switch elements (e.g., switches/servers/ports/channels) to apply a local or global group policy to the bundle. The software may be a master process that retrieves data from various locally running processes. The master process may aggregate the data per local or global group properties. Higher layer/level network services may also be used to apply (340) a policy on bundles of channels that are pertinent to the rest of the network (i.e. core router, ISP, DHCP server, etc.).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product, for managing network traffic, having a computer readable hardware memory with computer readable program code embodied therewith, the computer readable program code being configured to:
   establish a plurality of virtual ports of a virtual machine in a physical server, wherein the plurality of virtual ports include respective virtual port operating properties, and wherein network data traffic going through each virtual port is controlled via respective virtual port properties;
   establish a plurality of virtual channels assigned to the plurality of virtual ports, wherein network data traffic going through each virtual channel is controlled via respective virtual channel properties;
   assign a profile identifier to each of the plurality of virtual channels, wherein the profile identifier identifies a plurality of the virtual channel properties;
   group a first number of the virtual channels together into a first bundle based on a first client service level agreement, wherein virtual channel properties associated with the first number of virtual channels, within the bundle, are established based on the virtual port properties of the first virtual ports which the virtual channels, within the first bundle, span;
   group a second number of the virtual channels together into a second bundle based on a second client service level agreement, wherein virtual channel properties associated with the second number of virtual channels, within the bundle, are established based on the virtual port properties of the virtual ports which the second virtual channels, within the second bundle, span;
   determine whether the profile identifier in each of the virtual channels in the first bundle are shared with one of the virtual channels in the second bundle;

apply to each virtual channel in the first bundle that does not have its profile identifier shared by one of the virtual channels in the second bundle, one of a virtual local policy and a global policy, wherein the global policy relates to a client service, wherein the global policy includes global policy operating properties, and wherein the virtual port operating properties comply with the global policy operating properties.

2. The computer program product of claim 1, wherein the global policy is client specific.

3. The computer program product of claim 1, wherein the first bundle spans across multiple physical ports.

4. The computer program product of claim 1, wherein the computer program product is configured to provide the client service across multiple physical switches.

5. The computer program product of claim 1, wherein the computer program product is configured to associate a profile with each virtual channel, wherein the profile defines usable policies for respective virtual channels.

6. The computer program product of claim 1, wherein more than one client service is provided through the first bundle.

7. A network system, comprising:
a physical server;
one or more physical switches on the physical server;
a virtual machine including virtual ports on the one or more physical switches; and
an operating system configured to:
establish virtual channels associated with the virtual ports, wherein the virtual channels include respective virtual channel operating properties,
group a number of the virtual channels together into a first bundle, wherein the first bundle spans a first group of virtual ports,
group a number of the virtual channels together into a second bundle, wherein the second bundle spans a second group of virtual ports, and
apply a first set of bundle operating properties to the first bundle, wherein the first set of bundle operating properties defines a first policy applicable to each virtual channel associated with the first bundle, apply a second set of bundle operating properties to the second bundle, wherein the second set of bundle operating properties defines a second policy applicable to each virtual channel associated with the second bundle, wherein the first bundle operating properties are based on the operating properties of the first group of virtual ports, and the second bundle operating properties are based on the operating properties of the second group of virtual ports, and wherein a first customer bandwidth metering is determined based on the first bundle and a second customer bandwidth metering is determined based on the second bundle;
create a third bundle of a plurality of the virtual channels using a third policy for applying a third set of bundle operating properties, in which the third policy contains all parameters that are common to both the first policy and the second policy;
apply to each virtual channel, in both the first, second, and third bundles, one of a virtual local policy and a global policy.

8. The system of claim 7, wherein the set of properties relate to a client service provided through the virtual channels in the bundle.

9. The system of claim 8, wherein the client service is client specific.

10. The system of claim 8, wherein the client service is provided across multiple physical switches.

11. The system of claim 7, wherein the operating system assigns a profile to each virtual channel, wherein the profile defines usable policies for the respective virtual channels.

12. The system of claim 7, wherein the bundle spans across multiple physical ports on the server.

13. A physical network switch, comprising:
a first plurality of physical ports and a second plurality of physical ports, wherein network data traffic going through the first plurality of physical ports is controlled via first physical port operating properties, and wherein network data traffic going through the second plurality of physical ports is controlled via second physical port operating properties;
a virtual machine including one or more virtual ports connected through the first and second plurality of physical ports via a plurality of virtual channels; and
an operating system configured to:
group a number of the virtual channels together into a bundle;
apply a profile to each virtual port defining allowed policies for implementation of a client service, and
aggregate data from at least one of the first ports, the second ports, the virtual ports, and the virtual channels to apply to each virtual channel in the bundle a virtual local policy and a global policy, wherein the global policy defines which virtual ports in the network switch include the profile, wherein the profile applied to each virtual port complies with the global policy, and wherein data traffic for a first customer is tracked using the virtual local policy across the first plurality of physical ports based on the first physical port operating properties and data traffic for a second customer is tracked using the virtual local policy across the second plurality of physical ports based on the second physical port operating properties; and
create a first bandwidth desired by the first customer and a second bandwidth desired by the second customer based on a prioritized usage of the virtual channels.

14. The network switch of claim 13, wherein the bundle spans across more than one physical switch.

15. The network switch of claim 13, wherein the allowed policies include service level agreements.

* * * * *